(12) United States Patent
Wu

(10) Patent No.: US 12,193,115 B2
(45) Date of Patent: Jan. 7, 2025

(54) DATA PACKET BEARER PATH DETERMINING METHOD, INFORMATION SENDING METHOD AND DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 554 days.

(21) Appl. No.: 17/395,445

(22) Filed: Aug. 5, 2021

(65) Prior Publication Data
US 2021/0368580 A1  Nov. 25, 2021

Related U.S. Application Data

(63) Continuation of application No. PCT/CN2020/075027, filed on Feb. 13, 2020.

(30) Foreign Application Priority Data

Feb. 14, 2019 (CN) .......................... 201910114970.7

(51) Int. Cl.
*H04W 24/02* (2009.01)
*H04W 76/15* (2018.01)
*H04W 80/02* (2009.01)

(52) U.S. Cl.
CPC ........... *H04W 80/02* (2013.01); *H04W 24/02* (2013.01); *H04W 76/15* (2018.02)

(58) Field of Classification Search
None
See application file for complete search history.

(56) References Cited

U.S. PATENT DOCUMENTS

| | | |
|---|---|---|
| 2017/0034713 A1 | 2/2017 | Chan et al. |
| 2018/0098250 A1 | 4/2018 | Vrzic et al. |
| 2018/0302918 A1 | 10/2018 | Shaheen |
| 2018/0367288 A1 | 12/2018 | Vrzic |
| 2019/0215726 A1* | 7/2019 | Park ................... H04L 41/0816 |

(Continued)

FOREIGN PATENT DOCUMENTS

| | | |
|---|---|---|
| CN | 108401484 A | 8/2018 |
| CN | 108632809 A | 10/2018 |

(Continued)

OTHER PUBLICATIONS

International Search Report issued in corresponding International Application No. PCT/CN2020/075027, mailed May 20, 2020, 6 pages.

(Continued)

*Primary Examiner* — Duc T Duong
(74) *Attorney, Agent, or Firm* — IPX PLLC

(57) ABSTRACT

This application provides a data packet bearer path determining method, an information sending method, and a device. The data packet bearer path determining method includes determining, from a plurality of configuration paths of a target radio bearer (RB) or a plurality of active paths in the plurality of configuration paths, a bearer path of a Packet Data Convergence Protocol (PDCP) non-duplicated data packet corresponding to the target RB, where the target RB is an RB configured with a PDCP data duplication function.

20 Claims, 5 Drawing Sheets

Determine, from a plurality of configuration paths of a target radio bearer (RB) or a plurality of active paths in the plurality of configuration paths, a bearer path of a Packet Data Convergence Protocol (PDCP) non-duplicated data packet corresponding to the target RB, where the target RB is an RB configured with a PDCP data duplication function — S101

(56) References Cited

U.S. PATENT DOCUMENTS

| | | | |
|---|---|---|---|
| 2019/0268818 A1* | 8/2019 | Yi | H04W 36/0033 |
| 2019/0349139 A1* | 11/2019 | Park | H04W 76/27 |
| 2020/0077459 A1* | 3/2020 | Yi | H04W 72/51 |
| 2020/0119864 A1* | 4/2020 | Xu | H04L 1/1858 |
| 2020/0162366 A1* | 5/2020 | Vrzic | H04L 45/16 |
| 2020/0178331 A1* | 6/2020 | Xu | H04W 76/16 |
| 2020/0236734 A1* | 7/2020 | Wei | H04W 80/02 |
| 2021/0084539 A1* | 3/2021 | Centonza | H04W 28/06 |
| 2021/0126746 A1* | 4/2021 | Li | H04L 5/0055 |
| 2021/0377785 A1* | 12/2021 | Zhao | H04W 72/21 |
| 2022/0131646 A1* | 4/2022 | Pradas | H04W 76/15 |
| 2023/0354084 A1* | 11/2023 | Baek | H04W 80/08 |

FOREIGN PATENT DOCUMENTS

| | | |
|---|---|---|
| CN | 108809476 A | 11/2018 |
| CN | 109150388 A | 1/2019 |
| CN | 109150415 A | 1/2019 |
| CN | 109151903 A | 1/2019 |
| IN | 109151891 A | 1/2019 |
| WO | 2018231425 A4 | 2/2019 |

OTHER PUBLICATIONS

Samsung, "Consideration on Required Reliability for Tx carrier selection", "3GPP TSG-RAN WG2 Meeting #101, R2-1802600" Feb. 2018.

Huawei et al., "Link selection upon duplication deactivation", "3GPP TSG-RAN2 #99, R2-1707714", Aug. 12, 2017.

First Office Action issued in related Chinese application No. 201910114970.7, mailed Mar. 23, 2021, 14 pages.

Vivo, "Consideration on multi-leg PDCP duplication", 3GPP TSG-RAN WG2 Meeting #104 R2-1816941 Nov. 16, 2018.

* cited by examiner

Determine, from a plurality of configuration paths of a target radio bearer (RB) or a plurality of active paths in the plurality of configuration paths, a bearer path of a Packet Data Convergence Protocol (PDCP) non-duplicated data packet corresponding to the target RB, where the target RB is an RB configured with a PDCP data duplication function — S101

FIG. 1

Determine, from a plurality of active paths in a plurality of configuration paths of a target radio bearer (RB), at least one bearer path of a Packet Data Convergence Protocol (PDCP) duplicated data packet corresponding to the target RB, where the target RB is an RB configured with a PDCP data duplication function — S201

FIG. 2

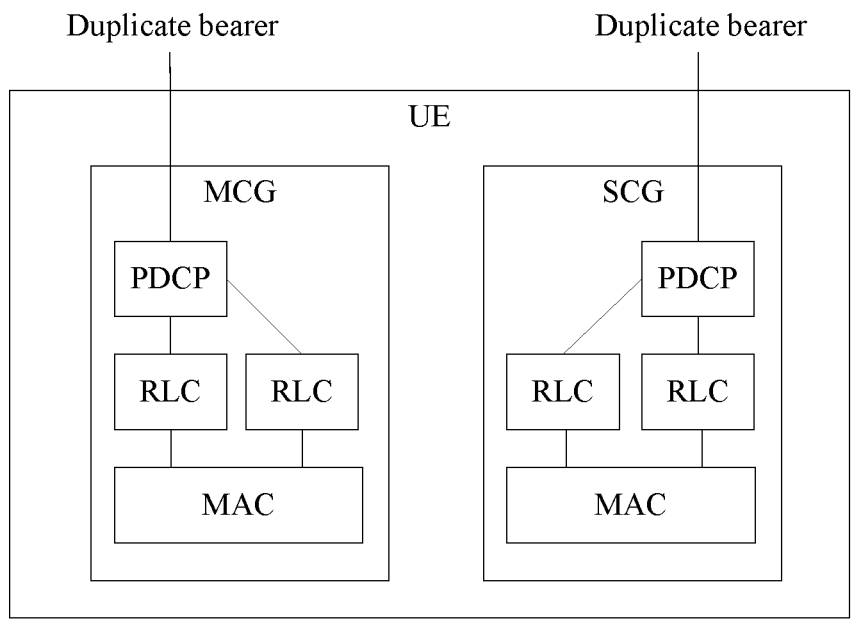

FIG. 3A

Multi-path duplicate bearer

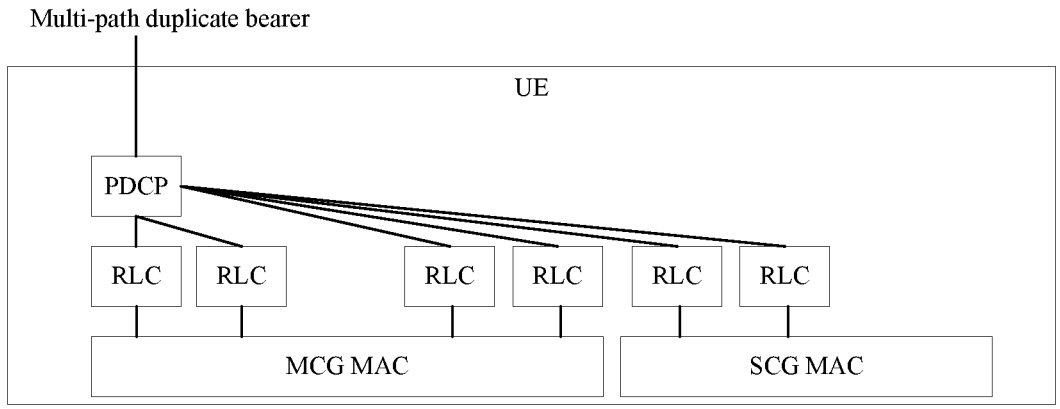

FIG. 4B

Send first target information, where the first target information is used to determine a first bearer path, the first bearer path is used to bear a Packet Data Convergence Protocol (PDCP) non-duplicated data packet corresponding to a target radio bearer (RB) of a terminal device, and the first bearer path is an active path in a plurality of configuration paths of the target RB — S501

FIG. 5

Send second target information, where the second target information is used to configure a preset threshold corresponding to a preset channel quality parameter, the preset threshold is used to determine at least one second bearer path, the second bearer path is used to bear a Packet Data Convergence Protocol (PDCP) duplicated data packet corresponding to a target radio bearer (RB) of a terminal device, the second bearer path is an active path in a plurality of configuration paths of the target RB, and a preset channel quality parameter of the second bearer path is higher or lower than the preset threshold — S601

FIG. 6

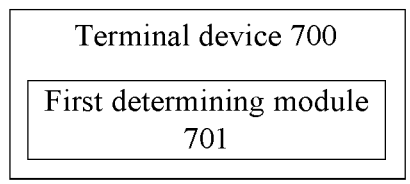

FIG. 7

DATA PACKET BEARER PATH DETERMINING METHOD, INFORMATION SENDING METHOD AND DEVICE

CROSS-REFERENCE TO RELATED APPLICATIONS

This application is a bypass continuation of PCT Application No. PCT/CN2020/075027 filed Feb. 13, 2020, which claims priority to Chinese Patent Application No. 201910114970.7, filed on Feb. 14, 2019 in China, both of which are incorporated herein by reference in their entireties.

TECHNICAL FIELD

The present disclosure relates to the field of communications technologies, and more specifically, to a data packet bearer path determining method, an information sending method, and a device.

BACKGROUND

In a wireless communications system, to further improve data transmission reliability and/or reduce a data transmission delay, a Packet Data Convergence Protocol (PDCP) data duplication function of a radio bearer (RB) is introduced on a terminal device (User Equipment, UE) side. The PDCP data duplication function is a technology in which data of a PDCP entity is duplicated, and duplicated data is separately sent on a plurality of (two or more) different paths. For example, the duplicated data is separately sent by using a plurality of radio link control (RLC) entities, and different RLC entities correspond to different logical channels.

The PDCP data duplication function may be configured by a network side. For example, the network side may first configure the function for the RB on the UE side by using a radio resource control (RRC) message, and then instruct, by using medium access control-control signaling (Medium Access Control Element, MAC CE), to activate (enable) or deactivate (disable) the function of the RB; or the network side may configure the function for the RB on the UE side by using an RRC message, and configure, by using the RRC message, whether the function is activated immediately after the configuration, that is, the function does not need to be additionally activated by using MAC CE signaling.

SUMMARY

According to a first aspect, a data packet bearer path determining method is provided, where the method is applied to a terminal device and includes: determining, from a plurality of configuration paths of a target radio bearer (RB) or a plurality of active paths in the plurality of configuration paths, a bearer path of a Packet Data Convergence Protocol (PDCP) non-duplicated data packet corresponding to the target RB, where the target RB is an RB configured with a PDCP data duplication function.

According to a second aspect, a data packet bearer path determining method is provided, where the method is applied to a terminal device and includes: determining, from a plurality of active paths in a plurality of configuration paths of a target RB, at least one bearer path of a PDCP duplicated data packet corresponding to the target RB, where the target RB is an RB configured with a PDCP data duplication function.

According to a third aspect, an information sending method is provided, where the method is applied to a network device and includes: sending first target information, where the first target information is used to determine a first bearer path, the first bearer path is used to bear a PDCP non-duplicated data packet corresponding to a target RB of a terminal device, and the first bearer path is an active path in a plurality of configuration paths of the target RB.

According to a fourth aspect, an information sending method is provided, where the method is applied to a network device and includes: sending second target information, where the second target information is used to configure a preset threshold corresponding to a preset channel quality parameter, the preset threshold is used to determine at least one second bearer path, the second bearer path is used to bear a PDCP duplicated data packet corresponding to a target RB of a terminal device, the second bearer path is an active path in a plurality of configuration paths of the target RB, and a preset channel quality parameter of the second bearer path is higher or lower than the preset threshold.

According to a fifth aspect, a terminal device is provided, and the terminal device includes: a first determining module, configured to determine, from a plurality of configuration paths of a target RB or a plurality of active paths in the plurality of configuration paths, a bearer path of a PDCP non-duplicated data packet corresponding to the target RB, where the target RB is an RB configured with a PDCP data duplication function.

According to a sixth aspect, a terminal device is provided, and the terminal device includes: a second determining module, configured to determine, from a plurality of active paths in a plurality of configuration paths of a target RB, at least one bearer path of a PDCP duplicated data packet corresponding to the target RB, where the target RB is an RB configured with a PDCP data duplication function.

According to a seventh aspect, a network device is provided, and the network device includes: a first sending module, configured to send first target information, where the first target information is used to determine a first bearer path, the first bearer path is used to bear a PDCP non-duplicated data packet corresponding to a target RB of a terminal device, and the first bearer path is an active path in a plurality of configuration paths of the target RB.

According to an eighth aspect, a network device is provided, and the network device includes: a second sending module, configured to send second target information, where the second target information is used to configure a preset threshold corresponding to a preset channel quality parameter, the preset threshold is used to determine at least one second bearer path, the second bearer path is used to bear a PDCP duplicated data packet corresponding to a target RB of a terminal device, the second bearer path is an active path in a plurality of configuration paths of the target RB, and a preset channel quality parameter of the second bearer path is higher or lower than the preset threshold.

According to a ninth aspect, a terminal device is provided. The terminal device includes a memory, a processor, and a radio communication program that is stored in the memory and that can be run by the processor, where when the radio communication program is executed by the processor, the steps of the method in the first aspect or the second aspect are implemented.

According to a tenth aspect, a network device is provided. The network device includes a memory, a processor, and a radio communication program that is stored in the memory and that can be run by the processor, where when the radio communication program is executed by the processor, the steps of the method in the third aspect or the fourth aspect are implemented.

According to an eleventh aspect, a computer-readable medium is provided. The computer-readable medium stores a radio communication program, and when the radio communication program is executed by a processor, the steps of the method in any one of the first aspect to the fourth aspect are implemented.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

FIG. 1 is a schematic flowchart of a data packet bearer path determining method according to some embodiments of the present disclosure;

FIG. 2 is a schematic flowchart of another data packet bearer path determining method according to some embodiments of the present disclosure;

FIG. 3A is a schematic diagram 1 of a bearer type of a PDCP data duplication function according to some embodiments of the present disclosure;

FIG. 4B is a schematic diagram 2 of multi-path PDCP data duplication according to some embodiments of the present disclosure;

FIG. 5 is a schematic flowchart of an information sending method according to some embodiments of the present disclosure;

FIG. 6 is a schematic flowchart of another information sending method according to some embodiments of the present disclosure;

FIG. 7 is a schematic structural diagram of a terminal device 700 according to some embodiments of the present disclosure;

DETAILED DESCRIPTION

Figure 3B:
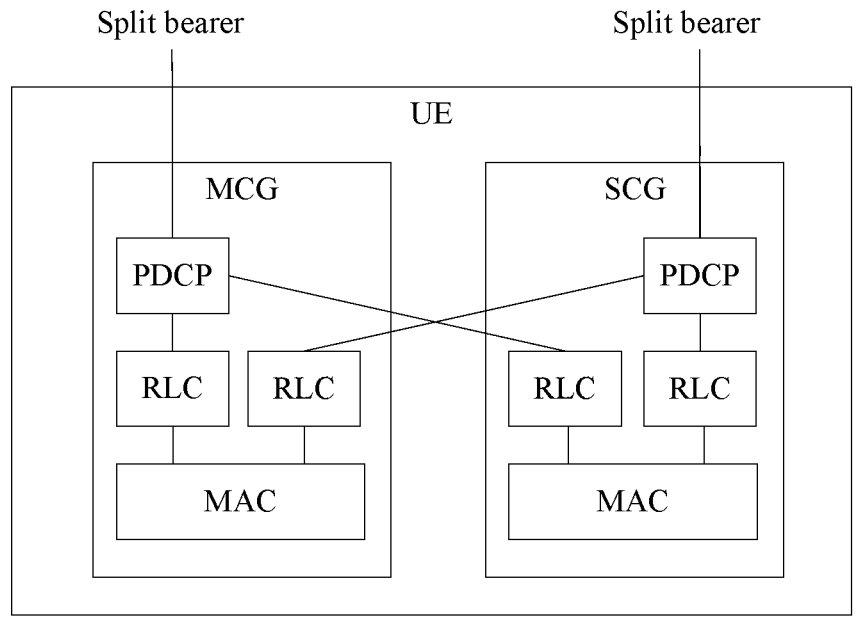
FIG. 3B is a schematic diagram 2 of a bearer type of a PDCP data duplication function according to some embodiments of the present disclosure.

In order to help a person skilled in the art better understand the technical solutions of the present disclosure, the following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to various communications systems, such as Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS) or a Worldwide Interoperability for Microwave Access (WiMAX) communications system, a 5G system, or a new radio (NR) system.

A terminal device (User Equipment, UE), also referred to as a mobile terminal, a mobile terminal device, and the like, may communicate with one or more core networks through a radio access network (RAN). The terminal device may be a mobile terminal, such as a mobile phone (or also referred to as a "cellular" phone) and a computer with a mobile terminal. For example, the terminal device may be a portable, pocket-sized, handheld, computer built-in, or in-vehicle mobile apparatus, which exchanges voice and/or data with the radio access network.

A network device is an apparatus for sending information deployed in a radio access network device, and the network device may be a base station. The base station may be a base transceiver station (BTS) in GSM or CDMA, or may be a NodeB (NodeB) in WCDMA, or may be an evolved NodeB (eNB or e-NodeB) and a 5G base station (gNB) in LTE, or a network side device in a subsequent evolved communications system. However, the words do not constitute a limitation on the protection scope of the present disclosure.

It should be noted that, during description of specific embodiments, sequence numbers of processes do not mean execution sequences. The execution sequences of the processes should be determined according to functions and internal logic of the processes, and should not be construed as any limitation on the implementation processes of the embodiments of the present disclosure.

As shown in FIG. 1, a data packet bearer path determining method provided in some embodiments of the present disclosure is applied to a terminal device, and the method may include the following step.

Step 101: Determine, from a plurality of configuration paths of a target RB or a plurality of active paths in the plurality of configuration paths, a bearer path of a PDCP non-duplicated data packet corresponding to the target RB, where the target RB is an RB configured with a PDCP data duplication function.

The plurality of configuration paths are a plurality of paths configured by a network device for the target RB to send data packets. The plurality of active paths are a plurality of paths in the plurality of configuration paths that are further activated by the network device when the plurality of configuration paths are configured or after the plurality of configuration paths are configured.

Optionally, step 101 may be performed in a case that a primary path of the PDCP non-duplicated data packet corresponding to the target RB is deactivated. The primary path is a path that is preconfigured on the network side and that is used to bear the Packet Data Convergence Protocol (PDCP) non-duplicated data packet corresponding to the target RB. The primary path may be one of the plurality of configuration paths, and the primary path is in a deactivated state when the data packet bearer path determining method provided in some embodiments of the present disclosure is implemented.

The target RB may be a specific RB, such as a data radio bearer (DRB) numbered 1, such as a DRB1; or a specific signaling radio bearer (SRB), such as an SRB1.

The SRB is used to transmit a RRC message and a non-access stratum (NAS) message. The SRB includes an SRB0, an SRB1, and an SRB2.

The following first describes a process of configuring the PDCP data duplication function, the plurality of configuration paths, and the plurality of active paths for the target RB.

Optionally, in an example, before determining a bearer path of a PDCP non-duplicated data packet in step 101, the method shown in FIG. 1 may further include: receiving first information, where the first information is used to configure a PDCP data duplication function for the target RB; and configuring the PDCP data duplication function for the target RB based on the first information.

The first information may be carried in a RRC message, that is, the terminal device may receive the first information by receiving the RRC message, or the network device may configure the PDCP data duplication function for the target RB of the terminal device by using the RRC message.

Further, based on the foregoing example, the method shown in FIG. 1 may further include: activating the PDCP data duplication function of the target RB based on a preset activation manner. For example, the network side may first configure the PDCP data duplication function for the target RB by using an RR message, and then instruct, by using medium access control-control signaling (Medium Access Control Element, MAC CE), to activate (enable) or deactivate (disable) the function of the target RB; or the network side may configure the function for the target RB by using an RRC message, and configure, by using the RRC message, whether the function is activated immediately after the configuration, that is, the function does not need to be additionally activated by using MAC CE signaling.

Optionally, in another example, before determining a bearer path of a PDCP non-duplicated data packet in step 101, the method shown in FIG. 1 may further include: receiving second information, where the second information is used to configure the plurality of configuration paths for the target RB; and determining the plurality of configuration paths based on the second information.

The second information may also be carried in an RRC message. Optionally, RRC messages that bear the first information and the second information may be a same RRC message. For example, while configuring the PDCP data duplication function for the target RB of the terminal device by using an RRC message, the network device may configure the plurality of configuration paths (for example, configuring a path (leg) 1, a path 2, and a path 3) by using the RRC message.

Alternatively, the second information may be carried in a MAC CE, that is, the terminal device may receive the second information by receiving the MAC CE, or the network device may configure the plurality of configuration paths for the target RB of the terminal device by using the MAC CE.

Optionally, in still another example, before determining a bearer path of a PDCP non-duplicated data packet in step 101, the method shown in FIG. 1 may further include: receiving third information, where the third information is used to indicate the plurality of active paths; and determining the plurality of active paths based on the third information.

The third information may also be carried in an RRC message, or the third information may be carried in a MAC CE. Optionally, when the first information, the second information, and the third information are all carried in RRC messages, the RRC messages that bear the first information, the second information, and the third information may be a same RRC message. For example, while configuring the PDCP data duplication function for the target RB of the terminal device by using an RRC message, the network device may configure the plurality of configuration paths (for example, configuring a path (leg) 1, a path 2, and a path 3) and the plurality of active paths (for example, configuring an active path 1 and an active path 2) by using the RRC message.

For example, while configuring the PDCP data duplication function for the target RB of the terminal device by using an RRC message, the network device may configure the plurality of configuration paths (for example, configuring a path (leg) 1, a path 2, and a path 3) by using the RRC message, and then configure the plurality of active paths (for example, configuring an active path 1 and an active path 2) for the terminal device by using a MAC CE.

In the foregoing example, when configuring the plurality of configuration paths or the plurality of active paths, the network device may complete path configuration by using identifier information of a configuration path. The following uses the configuration of the plurality of active paths as an example to describe completion of path configuration based on identifier information of a path.

Optionally, in a more detailed example, the third information is used to indicate identifier information of the plurality of active paths, and determining the plurality of active paths based on the third information includes: determining the plurality of active paths based on the identifier information of the plurality of active paths that is indicated in the third information. The identifier information includes at least one of an RB identifier (for example, a DRB1 or an SRB1), a logical channel identifier (for example, a logical channel 1), a cell group identifier (for example, a master cell group (MCG) or a secondary cell group (SCG)), or a data flow identifier (for example, a QoS flow 1).

With reference to the detailed example, the following describes how to specifically determine the bearer path of the PDCP non-duplicated data packet of the target RB in step 101.

It may be learned from step 101 that in some embodiments of the present disclosure, the bearer path of the PDCP non-duplicated data packet of the target RB is determined from the plurality of configuration paths, or the bearer path of the PDCP non-duplicated data packet of the target RB is determined from the plurality of active paths.

In a first example, the terminal device determines the bearer path of the PDCP non-duplicated data packet of the target RB from the plurality of active paths. Specifically, the terminal device may determine the bearer path from the plurality of active paths based on a first preset manner. That is, the bearer path is determined based on the first preset manner.

The first preset determining manner may include but is not limited to any one of a first manner, a second manner, a third manner, and a fourth manner.

The first manner includes: determining the bearer path from the plurality of active paths based on indication information of a network device. That is, the network device may designate one of the plurality of active paths as the bearer path based on the indication information.

The indication information may be carried in an RRC message or a MAC CE.

Further, the indication information may be carried in RRC messages that are used to bear the first information, the second information, and the third information. For example, while configuring the PDCP data duplication function for the target RB by using an RRC message, the network device may configure the plurality of configuration paths (for example, configuring a path (leg) 1, a path 2, and a path 3) and the plurality of active paths (for example, configuring an active path 1 and an active path2) by using the RRC message, and indicate, by using the RRC message, a specific path (for example, the path 1) in the plurality of active paths to bear the PDCP non-duplicated data packet.

Alternatively, further, the indication information may be carried in MAC CEs that are used to bear the second information and/or the third information. For example, while configuring the plurality of active paths (for example, configuring an active path 1 and an active path 2) by using a MAC CE, the network device may indicate, by using the MAC CE, a specific path (for example, the path 1) in the plurality of active paths to bear the PDCP non-duplicated data packet.

The second manner includes: determining the bearer path from the plurality of active paths based on a first preset rule. The first preset rule is agreed upon by a protocol, that is, an active path used to bear the PDCP non-duplicated data packet is agreed upon by the protocol. Alternatively, the first preset rule may include: selecting any one of the plurality of active paths as the bearer path. For example, if the plurality of active paths include a path 1 and a path 2, one path may be selected from the path 1 and the path 2 as the bearer path randomly or according to any rule.

In the second manner, when the first preset rule is agreed upon by the protocol, the first preset rule may include but is not limited to any one of the following three rules.

In a first rule, the bearer path is determined from paths corresponding to a logical channel (LCH) of a master cell group MCG in the plurality of active paths.

Specifically, in the first rule, the terminal device may use any active path corresponding to the logical channel in the MCG as the bearer path, that is, the bearer path may be any active path corresponding to the logical channel in the MCG.

Alternatively, in the first rule, the terminal device may use an active path whose logical channel number meets a second preset condition in the MCG as the bearer path, that is, the bearer path may be the active path whose logical channel number meets the second preset condition in the MCG. For example, the second preset condition may include one or more of conditions such as a maximum logical channel number, a minimum logical channel number, an even logical channel number, and an odd logical channel number. For example, if the second preset condition is the maximum logical channel number, the MCG includes two active paths: a path 1 and a path 2, and logical channel numbers of the MCG corresponding to the two active paths are an LCH1 and an LCH2, an active path (the path 2) corresponding to the LCH2 may be used as the bearer path.

It should be noted that, in some embodiments of the present disclosure, an active path corresponding to a logical channel of an MCG is an active path in the MCG. Similarly, an active path corresponding to a logical channel of an SCG below is an active path in the SCG.

In a second rule, the bearer path is determined from paths corresponding to a logical channel of a secondary cell group SCG in the plurality of active paths.

Specifically, in the second rule, the terminal device may use any active path corresponding to the logical channel in the SCG as the bearer path, that is, the bearer path may be any active path corresponding to the logical channel in the SCG.

Alternatively, in the second rule, the terminal device may use an active path whose logical channel number meets a third preset condition in the SCG as the bearer path, that is, the bearer path may be the active path whose logical channel number meets the third preset condition in the SCG. For example, the third preset condition may include one or more of conditions such as a maximum logical channel number, a minimum logical channel number, an even logical channel number, and an odd logical channel number. For example, if the third preset condition is the minimum logical channel number, the SCG includes two active paths: a path 1 and a path 2, and logical channel numbers of the SCG corresponding to the two active paths are an LCH1 and an LCH2, an active path (the path 2) corresponding to the LCH1 may be used as the bearer path.

In a third rule, the terminal device may directly determine, as the bearer path, a path whose logical channel number meets a first preset condition in the plurality of active paths. That is, an active path in an MCG or an SCG is not distinguished, and the bearer path is directly determined based on whether the logical channel number meets the first preset condition. For example, the first preset condition may include one or more of conditions such as a maximum logical channel number, a minimum logical channel number, an even logical channel number, and an odd logical channel number. For example, if the first preset condition is the minimum logical channel number, the plurality of active paths include a path 1 and a path 2, and corresponding logical channel numbers are an LCH1 and an LCH2, an active path (the path 1) corresponding to the LCH1 may be used as the bearer path.

The third manner includes: determining the bearer path from the plurality of active paths based on a mode of a RLC entity associated with an active path.

For example, when a mode of an RLC entity associated with at least one of the plurality of active paths is an acknowledged mode (AM), and the mode of the RLC entity associated with the at least one of the plurality of active paths is an unacknowledged mode (UM), the bearer path is a path whose mode of an associated RLC entity is an AM in the plurality of active paths. For example, if the plurality of active paths include a path 1 and a path 2, a mode of an RLC entity associated with the path 1 is AM, and a mode of an RLC entity associated with the path 2 is UM, the path 1 may be determined as the bearer path.

It may be understood that when the bearer path is determined from the plurality of active paths based on the foregoing third manner, because the modes of the RLC entities associated with the plurality of active paths are considered, and an active path whose mode of an associated RLC entity is an AM is determined as the bearer path, the PDCP non-duplicated data packet of the target RB may be sent on a path of good channel quality, thereby improving transmission reliability of the PDCP non-duplicated data packet and/or reducing a transmission delay of the PDCP non-duplicated data packet.

The fourth manner includes: determining the bearer path from the plurality of active paths based on a channel quality measurement result of an active path.

Specifically, the terminal device may use a path with best channel quality in the plurality of active paths as the bearer path, that is, the bearer path may be the path with best channel quality in the plurality of active paths. Channel quality may be represented by using a preset channel quality parameter.

For example, if the plurality of active paths include a path 1 and a path 2, the preset channel quality parameter is reference signal received power (RSRP), and RSRP of the path 1 is greater than RSRP of the path 2, it indicates that channel quality of the path 1 is best, and the path 1 may be used as a bearer path of the PDCP duplicated data packet.

Alternatively, the terminal device may use a path whose preset channel quality parameter is higher than or lower than a preset threshold in the plurality of active paths as the bearer path, that is, the bearer path may be the path whose preset channel quality parameter is higher than or lower than the preset threshold in the plurality of active paths.

For example, if the plurality of active paths include a path 1 and a path 2, the preset channel quality parameter is RSRP, the preset threshold is RSRP=−20 dBm, RSRP of the path 1 is greater than the preset threshold, and RSRP of the path 2 is less than the preset threshold, it indicates that channel quality of the path 1 is better, and the path 1 may be used as a bearer path of the PDCP duplicated data packet.

The preset threshold may be configured by a network device, or may be agreed upon by a protocol.

In addition to RSRP, the preset channel quality parameter may be at least one of reference signal received quality (RSRQ), a reference signal time difference (RSTD), a received signal strength indicator (RSSI), a block error rate (BLER), a channel occupancy ratio (CR), a channel busy ratio (CBR), or a signal to interference plus noise ratio (SINR).

It may be understood that a path whose preset channel quality parameter is higher than or lower than a preset threshold in the plurality of active paths is used as the bearer path, so that path with better channel quality in the plurality of active paths is used as the bearer path. It should be noted that when a path with better channel quality is determined based on a preset channel quality parameter, a matching relationship between different channel quality parameters and a preset threshold is different. For example, when a path with better channel quality is determined based on RSRP, specifically, a path whose RSRP is higher than the preset threshold is determined as a path with better channel quality, and when a path with better channel quality is determined based on a BLER, a path whose BLER is lower than the preset threshold is determined as a path with better channel quality.

It should be further noted that when the bearer path is determined from the plurality of active paths based on the foregoing fourth manner, because channel quality of the plurality of active paths is considered and an active path with best or better channel quality is determined as the bearer path, the PDCP non-duplicated data packet of the target RB may be sent on a path with good channel quality, thereby improving transmission reliability of the PDCP non-duplicated data packet and/or reducing a transmission delay of the PDCP non-duplicated data packet.

In a second example, the terminal device may determine the bearer path of the PDCP non-duplicated data packet of the target RB from the configured active paths. Specifically, the terminal device may determine the bearer path from the plurality of active paths based on a second preset rule. That is, the bearer path is determined from the plurality of active paths based on the second preset rule.

Specifically, the second preset rule may include: selecting any one of the plurality of configuration paths as the bearer path. For example, if the plurality of configuration paths include a path 1, a path 2, a path 3, and a path 4, and the plurality of active paths include the path 1 and the path 2 in the plurality of configuration paths, the terminal device may select any one or two of the path 1, the path 2, the path 3, and the path 4 as a bearer path of the PDCP non-duplicated data packet. Optionally, the terminal device may use the path 1 and the path 2 as bearer paths of the PDCP duplicated data packet.

In view of the above, according to the data packet bearer path determining method provided in some embodiments of the present disclosure, a terminal device may determine a bearer path of a PDCP non-duplicated data packet from a plurality of configuration paths of a target RB or a plurality of active paths in the plurality of configuration paths, where the target RB is an RB configured with a PDCP data duplication function, so that a bearer path for sending a non-duplicated data packet of the target RB is clearly.

Optionally, if a plurality of bearer paths are determined by using step 101, the method shown in FIG. 1 may further include: selecting any bearer path from the plurality of determined bearer paths as a target bearer path; and sending the PDCP non-duplicated data packet on the target bearer path.

Optionally, if one bearer path is determined by using step 101, the method shown in FIG. 1 may further include: using the determined bearer path as a target bearer path, and sending the PDCP non-duplicated data packet on the target bearer path.

Optionally, the method shown in FIG. 1 may further include: reporting, to a MAC layer of the terminal device, a data amount of the PDCP non-duplicated data packet sent on the target bearer path, to improve communication validity.

It should be noted that, in some embodiments of the present disclosure, the PDCP non-duplicated data packet of the target RB may include but is not limited to at least one of a PDCP status packet (PDCP Status PDU), a robust header compression (ROHC) control packet, an uplink data compression (UDC) control packet, or an Ethernet header compression control packet.

The ROHC control packet may be, for example, an interspersed ROHC feedback packet. The UDC control packet may be, for example, a UDC feedback packet. The Ethernet header compression control packet may be, for example, an Ethernet header compression feedback packet. This is not enumerated in this specification.

The foregoing describes the data packet bearer path determining method applied to the terminal device. The following describes another data packet bearer path determining method applied to the terminal device by using FIG. 2. It should be noted that each data packet bearer path determining method provided in some embodiments of the present disclosure may be implemented in combination or may be implemented separately, that is, the methods shown in FIG. 1 and FIG. 2 may be implemented in combination or separately.

As shown in FIG. 2, another data packet bearer path determining method provided in some embodiments of the present disclosure is applied to a terminal device, and the method may include the following step.

Step 201: Determine, from a plurality of active paths in a plurality of configuration paths of a target RB, at least one bearer path of a PDCP duplicated data packet corresponding to the target RB, where the target RB is an RB configured with a PDCP data duplication function.

The plurality of configuration paths are a plurality of paths configured by a network device for the target RB to send data packets. The plurality of active paths are a plurality of paths in the plurality of configuration paths that are further activated by the network device when the plurality of configuration paths are configured or after the plurality of configuration paths are configured. The plurality of configuration paths may be a plurality of RLC entities. The target RB may be a specific RB, such as a DRB1 or an SRB1.

Same as the descriptions of the embodiment shown in FIG. 1, the following first describes a process of configuring the PDCP data duplication function, the plurality of configuration paths, the plurality of active paths, and a quantity of copies for the target RB.

Optionally, in an example, before determining at least one bearer path of a PDCP duplicated data packet in step 201, the method shown in FIG. 2 may further include: receiving first information, where the first information is used to configure a PDCP data duplication function for the target RB; and configuring the PDCP data duplication function for the target RB based on the first information.

The first information may be carried in an RRC message, that is, the terminal device may receive the first information by receiving the RRC message, or the network device may configure the PDCP data duplication function for the target RB of the terminal device by using the RRC message.

Further, based on the foregoing example, the method shown in FIG. 2 may further include: activating the PDCP data duplication function of the target RB based on a preset activation manner. For example, the network device may first configure the PDCP data duplication function for the target RB by using an RRC message, and then instruct, by using a MAC CE, to activate (enable) or deactivate (disable) the function of the target RB; or the network side may configure the function for the target RB by using an RRC message, and configure, by using the RRC message, whether the function is activated immediately after the configuration, that is, the function does not need to be additionally activated by using MAC CE signaling.

Optionally, in another example, before determining at least one bearer path of a PDCP duplicated data packet in step 201, the method shown in FIG. 2 may further include: receiving second information, where the second information is used to configure the plurality of configuration paths for the target RB; and determining the plurality of configuration paths based on the second information.

The second information may also be carried in an RRC message, or the second information may be carried in a MAC CE. When the first information and the second information are carried by using RRC messages, the RRC messages that bear the first information and the second information may be a same RRC message.

Optionally, in still another example, before determining at least one bearer path of a PDCP duplicated data packet in step 201, the method shown in FIG. 2 may further include: receiving third information, where the third information is used to indicate the plurality of active paths; and determining the plurality of active paths based on the third information.

The third information may be carried in an RRC message, or the third information may be carried in a MAC CE. Optionally, when the first information, the second information, and the third information are carried by using RRC messages, the RRC messages that bear the first information, the second information, and the third information may be a same RRC message. When the first information is carried in an RRC message, and the second information and the third information are carried in MAC CEs, the MAC CEs that bear the second information and the third information may be a same MAC CE.

In the foregoing example, when configuring the plurality of configuration paths or the plurality of active paths, the network device may complete path configuration by using identifier information of a configuration path. The following uses the configuration of the plurality of active paths as an example to describe completion of path configuration based on identifier information of a path.

For example, in a more detailed example, the third information may be used to indicate identifier information of the plurality of active paths. Correspondingly, determining the plurality of active paths based on the third information may include: determining the plurality of active paths based on the identifier information of the plurality of active paths that is indicated in the third information. The identifier information includes at least one of an RB identifier (for example, a DRB1 or an SRB1), a logical channel identifier (for example, a logical channel 1), a cell group identifier (for example, an MCG or an SCG), or a data flow identifier (for example, a QoS flow 1).

Optionally, in still another example, before determining at least one bearer path of a PDCP duplicated data packet in step 201, the method shown in FIG. 2 may further include: receiving fourth information, where the fourth information is used to configure a quantity of copies of the PDCP duplicated data packet; and determining the quantity of copies based on the fourth information.

The fourth information may also be carried in an RRC message, or the fourth information may be carried in a MAC CE.

Generally, the first information may be carried in an RRC message, and the second information, the third information, and the fourth information may be carried in RRC messages, or may be carried in MAC CEs. The following describes bearer statuses of the first information, the second information, the third information, and the fourth information by using three detailed examples.

For example, while configuring the PDCP data duplication function for the target RB of the terminal device by using an RRC message, the network device may configure the plurality of configuration paths (for example, configuring a path 1, a path 2, a path 3, and a path 4 for a DRB1) and configure the plurality of active paths (for example, configuring an active path 1 and an active path 2) in the plurality of configuration paths by using the RRC message, and configure the quantity 3 of copies of the PDCP duplicated data packet by using the RRC message.

For another example, while configuring the PDCP data duplication function for the target RB of the terminal device by using an RRC message, the network device may configure the plurality of configuration paths (for example, configuring a path 1, a path 2, a path 3, and a path 4 for a DRB1) by using the RRC message, and configure the quantity 3 of copies of the PDCP duplicated data packet by using the RRC message; and then configure the plurality of active paths (for example, configuring an active path 1 and an active path 2) for the terminal device by using a MAC CE.

For another example, while configuring the PDCP data duplication function for the target RB of the terminal device by using an RRC message, the network device may configure the plurality of configuration paths (for example, configuring a path 1, a path 2, a path 3, and a path 4 for a DRB1) by using the RRC message. Then the network device configures the plurality of active paths (for example, configuring an active path 1 and an active path 2) for the terminal device by using a MAC CE, and configures the quantity 3 of copies of the PDCP duplicated data packet by using the MAC CE.

With reference to the detailed example, the following describes how to specifically determine the at least one bearer path of the PDCP duplicated data packet of the target RB in step 201.

In an example, step 201 may specifically include: determining the at least one bearer path from the plurality of active paths based on a second preset determining manner.

The second preset determining manner may include but is not limited to any one of a first manner, a second manner, and a third manner.

The first manner includes: determining the at least one bearer path from the plurality of active paths based on a channel quality measurement result of an active path.

Specifically, in the first manner, a path with best channel quality in the plurality of active paths may be determined as the at least one bearer path, that is, the at least one bearer path is the path with best channel quality in the plurality of active paths. Channel quality may be represented by using a preset channel quality parameter.

For example, if the plurality of active paths include a path 1 and a path 2, the preset channel quality parameter is reference signal received power (RSRP), and RSRP of the path 1 is greater than RSRP of the path 2, it indicates that channel quality of the path 1 is better, and the path 1 may be used as a bearer path of the PDCP duplicated data packet.

Alternatively, in the first manner, a path whose preset channel quality parameter is higher than or lower than a preset threshold in the plurality of active paths may be determined as the at least one bearer path, that is, the at least one bearer path is the path whose preset channel quality parameter is higher than or lower than the preset threshold in the plurality of active paths. The preset threshold may be configured by a network device, or may be agreed upon by a protocol.

For example, if the plurality of active paths include a path 1 and a path 2, the preset channel quality parameter is RSRP, the preset threshold is RSRP=−20 dBm, RSRP of the path 1 is greater than the preset threshold, and RSRP of the path 2 is less than the preset threshold, it indicates that channel quality of the path 1 is better, and the path 1 may be used as a bearer path of the PDCP duplicated data packet.

The second manner includes: determining the at least one bearer path from the plurality of active paths based on a mode of an RLC entity associated with an active path.

Specifically, in the second manner, when modes of RLC entities associated with the plurality of active paths are all an unacknowledged mode UM, the at least one bearer path may be further determined based on channel quality measurement results of the plurality of active paths, that is, the at least one bearer path is determined based on the channel quality measurement results of the plurality of active paths.

For example, a path with best channel quality in the plurality of active paths may be determined as the at least one bearer path, that is, the at least one bearer path is the path with best channel quality in the plurality of active paths; or a path whose preset channel quality parameter is higher or lower than a preset threshold in the plurality of active paths may be determined as the at least one bearer path, that is, the at least one bearer path is the path whose preset channel quality parameter is higher or lower than the preset threshold in the plurality of active paths. The preset threshold may be configured by a network device, or may be agreed upon by a protocol.

In the first determining manner and the second determining manner, the preset channel quality parameter may include at least one of parameters such as reference signal received power RSRP, reference signal received quality RSRQ, a reference signal time difference RSTD, a received signal strength indicator RSSI, a block error rate BLER, a channel occupancy ratio CR, a channel busy ratio CBR, or a signal to interference plus noise ratio SINR.

It may be understood that the active path with best channel quality in the plurality of active paths or the path whose preset channel quality parameter is higher than or lower than the preset threshold in the plurality of active paths is used as the at least one bearer path, so that a path with better channel quality in the plurality of active paths is used as the at least one bearer path. It should be noted that when a path with better channel quality is determined based on a preset channel quality parameter, a matching relationship between different channel quality parameters and a preset threshold is different. For example, when a path with better channel quality is determined based on RSRP, specifically, a path whose RSRP is higher than the preset threshold is determined as a path with better channel quality, and when a path with better channel quality is determined based on a BLER, a path whose BLER is lower than the preset threshold is determined as a path with better channel quality.

Alternatively, in the second manner, when modes of RLC entities associated with the plurality of active paths are all acknowledged modes AM, the at least one bearer path may be determined based on a quantity of copies of the PDCP duplicated data packet configured by the network device, that is, the at least one bearer path is determined based on the quantity of copies.

Optionally, in the second manner, when the at least one bearer path is determined based on the quantity of copies, the method shown in FIG. 2 may further include: separately sending the PDCP duplicated data packets of the quantity of copies on the at least one bearer path, where bearer paths corresponding to different PDCP duplicated data packets obtained through duplication are different. That is, a plurality of PDCP duplicated data packets obtained through duplication are separately sent on different paths in the at least one bearer path.

For example, if the plurality of active paths of the target RB include a path 1 and a path 2, modes of RLC entities associated with the path 1 and the path 2 are AM, and the quantity of copies of the PDCP duplicated data packet is 2, the two data packets obtained through duplication may be separately sent on the path 1 and the path 2.

It may be understood that, in the first determining manner and the second determining manner, because at least one of the following factors is considered: the modes of the RLC entities associated with the plurality of active paths, the channel quality of the plurality of active paths, and the quantity of copies of the PDCP duplicated data packet, transmission reliability of the PDCP duplicated data packet can be improved and/or a transmission delay of the PDCP duplicated data packet can be reduced.

The third manner includes: determining the at least one bearer path from the plurality of active paths based on a third preset rule.

Specifically, the third preset rule may include: selecting any one or more of the plurality of configuration paths as the at least one bearer path. For example, if the plurality of configuration paths include a path 1, a path 2, a path 3, and a path 4, and the plurality of active paths include the path 1 and the path 2 in the plurality of configuration paths, the terminal device may select any one or two of the path 1 and the path 2 as a bearer path of the PDCP duplicated data packet.

In view of the above, according to the data packet bearer path determining method provided in some embodiments of the present disclosure, a terminal device may determine, from a plurality of active paths in a plurality of configuration paths of a target RB, at least one bearer path of a PDCP duplicated data packet corresponding to the target RB, instead of specifying a bearer path by a network side. Therefore, flexibility of a bearer path for sending a duplicated data packet can be improved.

Optionally, the method shown in FIG. 2 may further include: sending the PDCP duplicated data packets of the quantity of copies on the at least one bearer path.

Optionally, the method shown in FIG. 2 may further include: reporting, to a MAC layer of the terminal device, a data amount of the PDCP duplicated data packet sent on the bearer path, to improve communication validity.

The following briefly describes a bearer type of the PDCP data duplication function and a principle of multi-path PDCP data duplication in the embodiment shown in FIG. 1 and the embodiment shown in FIG. 2 by using FIG. 3A, FIG. 3B, FIG. 4A, and FIG. 4B.

In an example, in a 5G system, a dual connectivity (DC) architecture that includes two cell groups MCG and SCG is used. Therefore, the bearer type of the PDCP data duplication function may include two types shown in FIG. 3A and FIG. 3B.

The bearer type of the PDCP data duplication function shown in FIG. 3A is a duplicate bearer. In a radio bearer of the bearer type, one PDCP entity, two or more RLC entities, and one MAC entity that are corresponding to the radio bearer are in a same cell group. For example, for a PDCP entity in an MCG, two or more RLC entities and one MAC entity that are corresponding to the PDCP entity in the MCG are in the MCG. For a PDCP entity in an SCG, two or more RLC entities and one MAC entity that are corresponding to the PDCP entity in the SCG are in the SCG.

The bearer type of the PDCP data duplication function shown in FIG. 3B is a split bearer (Split bearer). In a radio bearer of the bearer type, a PDCP entity corresponding to the radio bearer is in one cell group, and two or more RLC entities and two or more MAC entities that are corresponding to the radio bearer are in different cell groups.

Figure 4A:
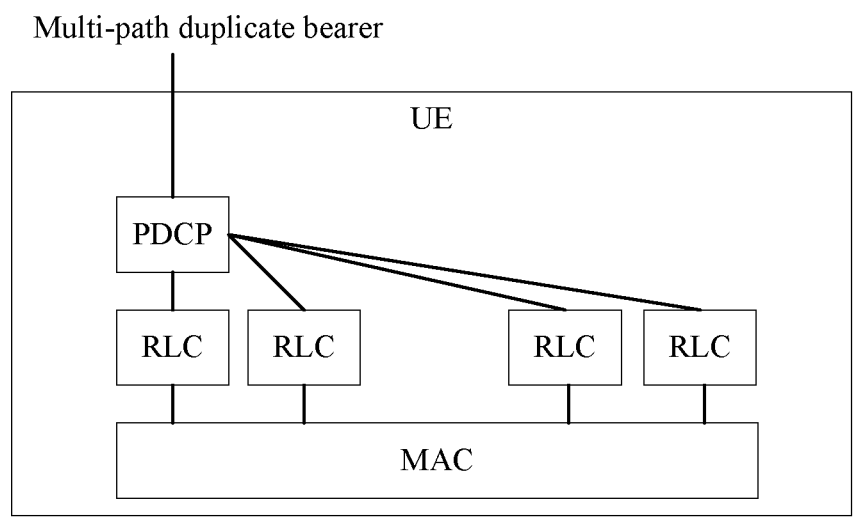
FIG. 4A is a schematic diagram 1 of multi-path PDCP data duplication according to some embodiments of the present disclosure.

For multi-path PDCP duplication (namely, Multiple Leg PDCP Duplication) or multi-path duplicate bearer (namely, Multiple leg Duplicate Bearer), the PDCP data duplication function may be configured to have more than two (for example, three) sending paths (for example, one PDCP entity corresponds to more than three RLC entities). As shown in FIG. 4A, a plurality of paths in a same cell group may be configured, or as shown in FIG. 4B, a plurality of paths that are not in a same cell group may be configured. After the configuration, the network device may choose to deactivate one or more of the paths (for example, one path may be deactivated, but two paths are still in an active state). The deactivated path is not used for receiving or sending data, and the PDCP data duplication function may still be used by using an active path.

The foregoing describes the data packet sending path determining method provided in some embodiments of the present disclosure. The following describes the information sending method provided in some embodiments of the present disclosure.

As shown in FIG. 5, an information sending method provided in some embodiments of the present disclosure is applied to a network device, and the method may include the following step:

Step 501: Send first target information, where the first target information is used to determine a first bearer path, the first bearer path is used to bear a PDCP non-duplicated data packet corresponding to a target RB of a terminal device, and the first bearer path is an active path in a plurality of configuration paths of the target RB.

In an example, the first target information is used to indicate a first bearer path, that is, the first target information directly indicates what the first bearer path is. For example, identifier information of the first bearer path is indicated (for specific content of the identifier information, reference is made to the above, and details are not described herein again). More specifically, in this case, the first target information may be carried in an RRC message used to configure a PDCP duplication function for the target RB of the terminal device.

In another example, the first target information is used to configure a preset threshold corresponding to a preset channel quality parameter, the preset threshold is used to determine the first bearer path, and a preset channel quality parameter of the first bearer path is higher than or lower than the preset threshold. That is, the network device indicates, to the terminal device, a preset threshold used to determine whether channel quality of an active path is good or bad, so that after measuring a corresponding channel quality parameter of the active path, the terminal device determines, by comparing with the preset threshold, whether the channel quality of the active path is good or bad, and a path with better channel quality is determined from active paths to bear the PDCP non-duplicated data packet.

The preset channel quality parameter includes at least one of reference signal received power RSRP, reference signal received quality RSRQ, a reference signal time difference RSTD, a received signal strength indicator RSSI, a block error rate BLER, a channel occupancy ratio CR, a channel busy ratio CBR, or a signal to interference plus noise ratio SINR.

According to the information sending method provided in the embodiment shown in FIG. 5, the network device may send, to the terminal device, the first target information that is used to determine the first bearer path of the PDCP non-duplicated data packet corresponding to the target RB. Therefore, the terminal device may determine, when a primary path used to bear the PDCP non-duplicated data packet corresponding to the target RB is deactivated, another path used to bear the PDCP non-duplicated data packet, thereby ensuring that PDCP non-duplicated data can be successfully sent and improving communication validity.

As shown in FIG. 6, an information sending method provided in some embodiments of the present disclosure is applied to a network device, and the method may include the following step.

Step 601: Send second target information, where the second target information is used to configure a preset threshold corresponding to a preset channel quality parameter, the preset threshold is used to determine at least one second bearer path, the second bearer path is used to bear a PDCP duplicated data packet corresponding to a target RB of a terminal device, the second bearer path is an active path in a plurality of configuration paths of the target RB, and a preset channel quality parameter of the second bearer path is higher or lower than the preset threshold.

That is, the network device indicates, to the terminal device, a preset threshold used to determine whether channel quality of an active path of the target RB is good or bad, so that after measuring a corresponding channel quality parameter of the active path, the terminal device determines, by comparing with the preset threshold, whether the channel quality of the active path is good or bad, and a path with better channel quality is determined from active paths to bear the PDCP duplicated data packet.

The preset channel quality parameter includes at least one of reference signal received power RSRP, reference signal received quality RSRQ, a reference signal time difference RSTD, a received signal strength indicator RSSI, a block error rate BLER, a channel occupancy ratio CR, a channel busy ratio CBR, or a signal to interference plus noise ratio SINR.

According to the information sending method provided in the embodiment shown in FIG. 6, the network device may send, to the terminal device, a preset threshold used to determine at least one second bearer path of the PDCP duplicated data packet corresponding to the target RB of the terminal device. Therefore, the terminal device may flexibly determine, based on the preset threshold, a path used to bear the PDCP duplicated data packet corresponding to the target RB. In addition, because a preset channel quality parameter of the determined second bearer path is higher than or lower than the preset threshold, that is, channel quality of the determined second bearer path is better, transmission reliability of the PDCP duplicated data packet can be improved, and a transmission delay of the PDCP duplicated data packet can be reduced.

The foregoing describes the method embodiments provided in this specification. Corresponding to the foregoing method embodiments, the present disclosure further provides a terminal device 700, a terminal device 800, a network device 900, and a network device 1000, which are separately described below.

FIG. 7 is a schematic structural diagram of a terminal device 700 according to some embodiments of the present disclosure. As shown in FIG. 7, the terminal device 700 may include a first determining module 701.

The first determining module 701 is configured to determine, from a plurality of configuration paths of a target RB or a plurality of active paths in the plurality of configuration paths, a bearer path of a PDCP non-duplicated data packet corresponding to the target RB, where the target RB is an RB configured with a PDCP data duplication function.

Optionally, in an example, the terminal device 700 may further include: a first receiving module, configured to: receive first information, where the first information is used to configure a PDCP data duplication function for the target RB; and configure the PDCP data duplication function for the target RB based on the first information.

The first information may be carried in an RRC message.

Optionally, in another example, the terminal device 700 may further include a second receiving module, configured to: receive second information, where the second information is used to configure the plurality of configuration paths for the target RB; and determine the plurality of configuration paths based on the second information.

The second information may also be carried in an RRC message, or the second information may be carried in a MAC CE. Optionally, the RRC messages that bear the first information and the second information may be a same RRC message.

Optionally, in still another example, the terminal device 700 may further include a third receiving module, configured to: receive third information, where the third information is used to indicate the plurality of active paths; and determine the plurality of active paths based on the third information.

The third information may also be carried in an RRC message, or the third information may be carried in a MAC CE. Optionally, when the first information, the second information, and the third information are all carried in RRC messages, the RRC messages that bear the first information, the second information, and the third information may be a same RRC message.

Optionally, in a more detailed example, the third information is used to indicate identifier information of the plurality of active paths, and the third receiving module may be configured to determine the plurality of active paths based on the identifier information of the plurality of active paths that is indicated in the third information.

With reference to the detailed example, the following describes how the first determining module 701 specifically determines the bearer path of the PDCP non-duplicated data packet of the target RB.

The first determining module 701 determines the bearer path of the PDCP non-duplicated data packet of the target RB from the plurality of configuration paths, or determines the bearer path of the PDCP non-duplicated data packet of the target RB from the plurality of active paths.

In a first example, the first determining module 701 determines the bearer path of the PDCP non-duplicated data packet of the target RB from the plurality of active paths. Specifically, the first determining module may determine the bearer path from the plurality of active paths based on a first preset manner. That is, the bearer path is determined from the plurality of active paths based on the first preset manner.

The first preset determining manner may include but is not limited to any one of a first manner, a second manner, a third manner, and a fourth manner.

The first manner includes: determining the bearer path from the plurality of active paths based on indication information of a network device. That is, the network device may designate one of the plurality of active paths as the bearer path based on the indication information.

The indication information may be carried in an RRC message or a MAC CE.

The second manner includes: determining the bearer path from the plurality of active paths based on a first preset rule. The first preset rule is agreed upon by a protocol, that is, an active path used to bear a PDCP non-duplicated data packet is agreed upon by the protocol; or the first preset rule may include: selecting any one of the plurality of active paths as the bearer path.

In the second manner, when the first preset rule is agreed upon by the protocol, the first preset rule may include but is not limited to any one of the following three rules.

In a first rule, the bearer path is determined from paths corresponding to an LCH of a master cell group MCG in the plurality of active paths.

Specifically, in the first rule, the terminal device may use any active path corresponding to the logical channel in the MCG as the bearer path, that is, the bearer path may be any active path corresponding to the logical channel in the MCG.

Alternatively, in the first rule, the terminal device may use an active path whose logical channel number meets a second preset condition in the MCG as the bearer path, that is, the bearer path may be the active path whose logical channel number meets the second preset condition in the MCG.

In a second rule, the bearer path is determined from paths corresponding to a logical channel of a secondary cell group SCG in the plurality of active paths.

Specifically, in the second rule, the terminal device may use any active path corresponding to the logical channel in the SCG as the bearer path, that is, the bearer path may be any active path corresponding to the logical channel in the SCG.

Alternatively, in the second rule, the terminal device may use an active path whose logical channel number meets a third preset condition in the SCG as the bearer path, that is, the bearer path may be the active path whose logical channel number meets the third preset condition in the SCG.

In a third rule, the terminal device may directly determine, as the bearer path, a path whose logical channel number meets a first preset condition in the plurality of active paths. That is, an active path in an MCG or an SCG is not distinguished, and the bearer path is directly determined based on whether the logical channel number meets the first preset condition.

The third manner includes: determining the bearer path from the plurality of active paths based on a mode of an RLC entity associated with an active path.

It may be understood that when the bearer path is determined from the plurality of active paths based on the foregoing third manner, because the modes of the RLC entities associated with the plurality of active paths are considered, and an active path whose mode of an associated RLC entity is an AM is determined as the bearer path, the PDCP non-duplicated data packet of the target RB may be sent on a path of good channel quality, thereby improving transmission reliability of the PDCP non-duplicated data packet and/or reducing a transmission delay of the PDCP non-duplicated data packet.

The fourth manner includes: determining the bearer path from the plurality of active paths based on a channel quality measurement result of an active path.

Specifically, the terminal device may use a path with best channel quality in the plurality of active paths as the bearer path, that is, the bearer path may be the path with best channel quality in the plurality of active paths. Channel quality may be represented by using a preset channel quality parameter.

Alternatively, the terminal device may use a path whose preset channel quality parameter is higher than or lower than a preset threshold in the plurality of active paths as the bearer path, that is, the bearer path may be the path whose preset channel quality parameter is higher than or lower than the preset threshold in the plurality of active paths.

It should be further noted that when the bearer path is determined from the plurality of active paths based on the foregoing fourth manner, because channel quality of the plurality of active paths is considered and an active path with best or better channel quality is determined as the bearer path, the PDCP non-duplicated data packet of the target RB may be sent on a path with good channel quality, thereby improving transmission reliability of the PDCP non-duplicated data packet and/or reducing a transmission delay of the PDCP non-duplicated data packet.

In a second example, the first determining module 701 determines the bearer path of the PDCP non-duplicated data packet of the target RB from the configured active paths. Specifically, the first determining module may determine the bearer path from the plurality of active paths based on a second preset rule. That is, the bearer path is determined from the plurality of active paths based on the second preset rule. The second preset rule may include: selecting any one of the plurality of configuration paths as the bearer path.

The terminal device 700 provided in some embodiments of the present disclosure may determine a bearer path of a PDCP non-duplicated data packet from a plurality of configuration paths of a target RB or a plurality of active paths in the plurality of configuration paths, where the target RB is an RB configured with a PDCP data duplication function, so that a bearer path for sending a non-duplicated data packet of the target RB is clearly.

Optionally, the terminal device 700 may further include: a non-duplicated data packet sending module, configured to: if there are a plurality of determined bearer paths, select any bearer path from the plurality of determined bearer paths as a target bearer path; and send the PDCP non-duplicated data packet on the target bearer path; or if there is one determined bearer path, use the determined bearer path as a target bearer path, and send the PDCP non-duplicated data packet on the target bearer path.

Optionally, the terminal device 700 may further include a data amount reporting module, configured to report, to a MAC layer of the terminal device, a data amount of the PDCP non-duplicated data packet sent on the target bearer path, to improve communication validity.

The terminal device 700 shown in FIG. 7 may be configured to implement the embodiments of the data packet bearer path determining method shown in FIG. 1. For related details, refer to the foregoing method embodiments.

Figure 8:
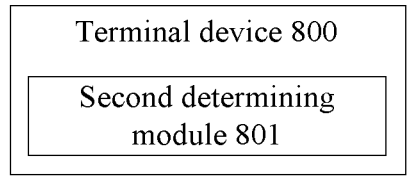
FIG. 8 is a schematic structural diagram of a terminal device 800 according to some embodiments of the present disclosure.

FIG. 8 is a schematic structural diagram of a terminal device 800 according to some embodiments of the present disclosure. As shown in FIG. 8, the terminal device 800 may include a second determining module 801.

The second determining module 801 is configured to determine, from a plurality of active paths in a plurality of configuration paths of a target RB, at least one bearer path of a PDCP duplicated data packet corresponding to the target RB, where the target RB is an RB configured with a PDCP data duplication function.

Optionally, in an example, the terminal device 800 may further include: a first receiving module, configured to receive first information before determining the at least one bearer path of the PDCP duplicated data packet, where the first information is used to configure a PDCP data duplication function for the target RB; and configure the PDCP data duplication function for the target RB based on the first information. The first information may be carried in an RRC message.

Optionally, in another example, the terminal device 800 may further include a second receiving module, configured to receive second information before determining the at least one bearer path of the PDCP duplicated data packet, where the second information is used to configure the plurality of configuration paths for the target RB; and determine the plurality of configuration paths based on the second information.

The second information may also be carried in an RRC message, or the second information may be carried in a MAC CE. When the first information and the second information are carried by using RRC messages, the RRC messages that bear the first information and the second information may be a same RRC message.

Optionally, in another example, the terminal device 800 may further include a third receiving module, configured to receive third information before determining the at least one bearer path of the PDCP duplicated data packet, where the third information is used to indicate the plurality of active paths; and determine the plurality of active paths based on the third information.

The third information may be carried in an RRC message, or the third information may be carried in a MAC CE. Optionally, when the first information, the second information, and the third information are carried by using RRC messages, the RRC messages that bear the first information, the second information, and the third information may be a same RRC message. When the first information is carried in an RRC message, and the second information and the third information are carried in MAC CEs, the MAC CEs that bear the second information and the third information may be a same MAC CE.

In a more detailed example, the third information is used to indicate identifier information of the plurality of active paths. Correspondingly, the third receiving module may be configured to determine the plurality of active paths based on the identifier information of the plurality of active paths that is indicated in the third information.

Optionally, in still another example, the terminal device 800 may further include a fourth receiving module, configured to receive fourth information before determining the at least one bearer path of the PDCP duplicated data packet, where the fourth information is used to configure a quantity of copies of the PDCP duplicated data packet; and determine the quantity of copies based on the fourth information.

The fourth information may also be carried in an RRC message, or the fourth information may be carried in a MAC CE.

Generally, the first information may be carried in an RRC message, and the second information, the third information, and the fourth information may be carried in RRC messages, or may be carried in MAC CEs. The following describes bearer statuses of the first information, the second information, the third information, and the fourth information by using three detailed examples.

With reference to the detailed example, the following describes how the second determining module 801 specifically determines the at least one bearer path of the PDCP duplicated data packet of the target RB.

In an example, the second determining module 801 may be configured to determine the at least one bearer path from the plurality of active paths based on a second preset determining manner.

The second preset determining manner may include but is not limited to any one of a first manner, a second manner, and a third manner.

The first manner includes: determining the at least one bearer path from the plurality of active paths based on a channel quality measurement result of an active path.

Specifically, in the first manner, a path with best channel quality in the plurality of active paths may be determined as the at least one bearer path; or a path whose preset channel quality parameter is higher than or lower than a preset threshold in the plurality of active paths may be determined as the at least one bearer path.

The second manner includes: determining the at least one bearer path from the plurality of active paths based on a mode of an RLC entity associated with an active path.

Specifically, in the second manner, when modes of RLC entities associated with the plurality of active paths are all an unacknowledged mode UM, the at least one bearer path may be further determined based on channel quality measurement results of the plurality of active paths. For example, a path with best channel quality in the plurality of active paths may be determined as the at least one bearer path, that is, the at least one bearer path is the path with best channel quality in the plurality of active paths; or a path whose preset channel quality parameter is higher or lower than a preset threshold in the plurality of active paths may be determined as the at least one bearer path, that is, the at least one bearer path is the path whose preset channel quality parameter is higher or lower than the preset threshold in the plurality of active paths. The preset threshold may be configured by a network device, or may be agreed upon by a protocol.

Alternatively, in the second manner, when modes of RLC entities associated with the plurality of active paths are all acknowledged modes AM, the at least one bearer path may be determined based on a quantity of copies of the PDCP duplicated data packet configured by the network device, that is, the at least one bearer path is determined based on the quantity of copies.

Optionally, in the second manner, when the at least one bearer path is determined based on the quantity of copies, the terminal device 800 shown in FIG. 8 may further include: a first duplicated data packet sending module, configured to separately send the PDCP duplicated data packets of the quantity of copies on the at least one bearer path, where bearer paths corresponding to different PDCP duplicated data packets obtained through duplication are different.

It may be understood that, in the first determining manner and the second determining manner, because at least one of the following factors is considered: the modes of the RLC entities associated with the plurality of active paths, the channel quality of the plurality of active paths, and the quantity of copies of the PDCP duplicated data packet, transmission reliability of the PDCP duplicated data packet can be improved and/or a transmission delay of the PDCP duplicated data packet can be reduced.

The third manner includes: determining the at least one bearer path from the plurality of active paths based on a third preset rule. Specifically, the third preset rule may include: selecting any one or more of the plurality of configuration paths as the at least one bearer path.

The terminal device 800 provided in some embodiments of the present disclosure may determine, from a plurality of active paths in a plurality of configuration paths of a target RB, at least one bearer path of a PDCP duplicated data packet corresponding to the target RB, instead of specifying a bearer path by a network side. Therefore, flexibility of a bearer path for sending a duplicated data packet can be improved.

Optionally, the terminal device 800 may further include: a second duplicated data packet sending module, configured to send the PDCP duplicated data packets of the quantity of copies on the at least one bearer path.

Optionally, the terminal device 800 may further include a data amount reporting module, configured to report, to a MAC layer of the terminal device, a data amount of the PDCP duplicated data packet sent on the bearer path, to improve communication validity.

The terminal device 800 shown in FIG. 8 may be configured to implement the embodiments of the data packet bearer path determining method shown in FIG. 2. For related details, refer to the foregoing method embodiments.

Figure 9:
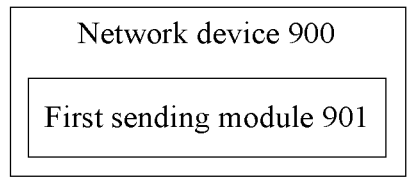
FIG. 9 is a schematic structural diagram of a network device 900 according to some embodiments of the present disclosure.

FIG. 9 is a schematic structural diagram of a network device 900 according to some embodiments of the present disclosure. As shown in FIG. 9, the network device 900 may include a first sending module 901.

The first sending module 901 is configured to send first target information, where the first target information is used to determine a first bearer path, the first bearer path is used to bear a PDCP non-duplicated data packet corresponding to a target RB of a terminal device, and the first bearer path is an active path in a plurality of configuration paths of the target RB.

In an example, the first target information is used to indicate the first bearer path, that is, the first target information directly indicates what the first bearer path is.

In another example, the first target information is used to configure a preset threshold corresponding to a preset channel quality parameter, the preset threshold is used to determine the first bearer path, and a preset channel quality parameter of the first bearer path is higher than or lower than the preset threshold. That is, the network device indicates, to the terminal device, a preset threshold used to determine whether channel quality of an active path is good or bad, so that after measuring a corresponding channel quality parameter of the active path, the terminal device determines, by comparing with the preset threshold, whether the channel quality of the active path is good or bad, and a path with better channel quality is determined from active paths to bear the PDCP non-duplicated data packet.

The network device 900 may send, to the terminal device, the first target information that is used to determine the first bearer path of the PDCP non-duplicated data packet corresponding to the target RB. Therefore, the terminal device may determine, when a primary path used to bear the PDCP non-duplicated data packet corresponding to the target RB is deactivated, another path used to bear the PDCP non-duplicated data packet, thereby ensuring that PDCP non-duplicated data can be successfully sent and improving communication validity.

The network device 900 shown in FIG. 9 may be configured to implement the embodiments of the information sending method shown in FIG. 5. For related details, refer to the foregoing method embodiments.

Figure 10:
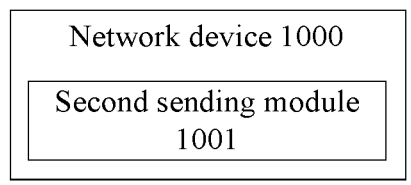
FIG. 10 is a schematic structural diagram of a network device 1000 according to some embodiments of the present disclosure.

FIG. 10 is a schematic structural diagram of a network device 1000 according to some embodiments of the present disclosure. As shown in FIG. 10, the network device 1000 may include a second sending module 1001.

The second sending module 1001 is configured to send second target information, where the second target information is used to configure a preset threshold corresponding to a preset channel quality parameter, the preset threshold is used to determine at least one second bearer path, the second bearer path is used to bear a PDCP duplicated data packet corresponding to a target RB of a terminal device, the second bearer path is an active path in a plurality of configuration paths of the target RB, and a preset channel quality parameter of the second bearer path is higher or lower than the preset threshold.

That is, the network device 1000 indicates, to the terminal device, a preset threshold used to determine whether channel quality of an active path of the target RB is good or bad, so that after measuring a corresponding channel quality parameter of the active path, the terminal device determines, by comparing with the preset threshold, whether the channel quality of the active path is good or bad, and a path with better channel quality is determined from active paths to bear the PDCP duplicated data packet.

The network device 1000 shown in FIG. 10 may send, to the terminal device, a preset threshold used to determine at least one second bearer path of the PDCP duplicated data packet corresponding to the target RB of the terminal device. Therefore, the terminal device may flexibly determine, based on the preset threshold, a path used to bear the PDCP duplicated data packet corresponding to the target RB. In addition, because a preset channel quality parameter of the determined second bearer path is higher than or lower than the preset threshold, that is, channel quality of the determined second bearer path is better, transmission reliability of the PDCP duplicated data packet can be improved, and a transmission delay of the PDCP duplicated data packet can be reduced.

The network device 1000 shown in FIG. 10 may be configured to implement the embodiments of the information sending method shown in FIG. 6. For related details, refer to the foregoing method embodiments.

Figure 11:
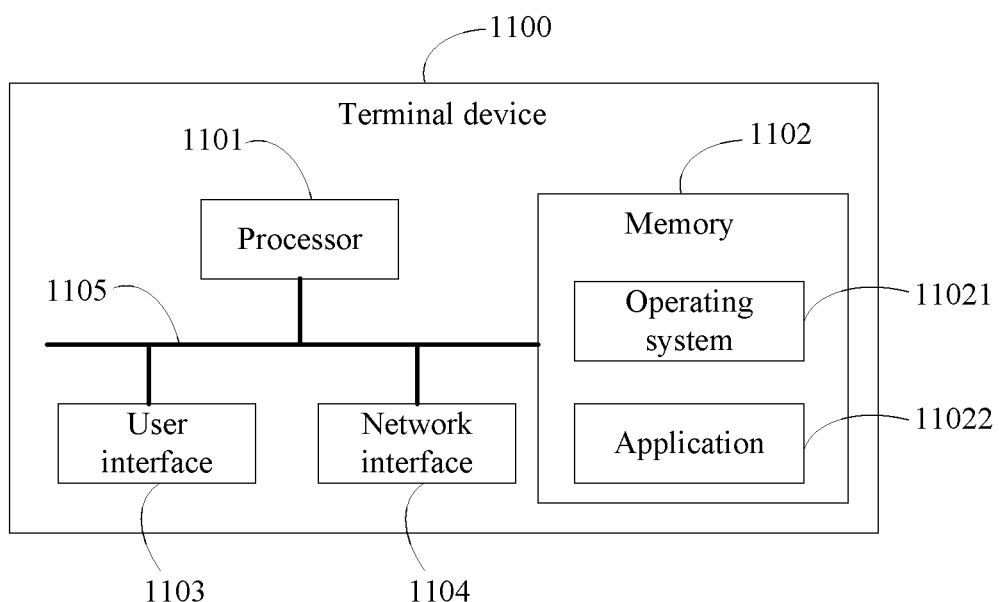
FIG. 11 is a schematic structural diagram of a terminal device 1100 according to some embodiments of the present disclosure.

FIG. 11 is a schematic structural diagram of a terminal device according to another embodiment of the present disclosure. As shown in FIG. 11, a terminal device 1100 includes: at least one processor 1101, a memory 1102, at least one network interface 1104, and a user interface 1103. All components of the terminal device 1100 are coupled together by using the bus system 1105. It can be understood that the bus system 1105 is configured to implement a connection and communication between these components. In addition to a data bus, the bus system 1105 may include a power bus, a control bus, and a status signal bus. However, for clarity of description, various buses are marked as the bus system 1105 in FIG. 11.

The user interface 1103 may include a display, a keyboard, or a clicking device (for example, a mouse, a trackball), a touch panel, or a touchscreen.

It can be understood that the memory 1102 in some embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1102 in the system and the method described in some embodiments of the present disclosure is intended to include, but is not limited to, these memories and memories of any other proper type.

In some implementations, the memory 1102 stores the following element: an executable module or a data structure, a subset thereof, or an extended set thereof: an operating system 11021 and an application 11022.

The operating system 11021 includes various system programs, such as a framework layer, a core library layer, and a driver layer, and is configured to implement various basic services and process hardware-based tasks. The application 11022 includes various applications, for example, a media player, and a browser, to implement various application services. A program for implementing the method in some embodiments of the present disclosure may be included in the application 11022.

In some embodiments of the present disclosure, the terminal device 1100 further includes a computer program that is stored in the memory 1102 and can be run by the processor 1101. When the computer program is executed by the processor 1101, the processes of the foregoing data packet bearer path determining method can be implemented, and a same technical effect can be achieved. To avoid repetition, details are not described herein again.

The methods disclosed in some embodiments of the present disclosure may be applied to the processor 1101 or implemented by the processor 1101. The processor 1101 may be an integrated circuit chip having a signal processing capability. During implementation, each step of the foregoing method may be completed by using an integrated logic circuit of hardware in the processor 1101 or an instruction in a form of software. The processor 1101 may be a general purpose processor, a digital signal processor (DSP), an application specific integrated circuit (ASIC), a field programmable gate array (FPGA), another programmable logic device, a discrete gate, a transistor logic device, or a discrete hardware component. The processor 1101 may implement or execute the methods, steps, and logic block diagrams disclosed in some embodiments of the present disclosure. The general-purpose processor may be a microprocessor or may be any conventional processor or the like. The steps of the method disclosed in some embodiments of the present disclosure may be directly performed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 1102, and the processor 1101 reads information from the memory 1102 and completes the steps of the foregoing method in combination with its hardware. Specifically, the computer-readable storage medium stores a computer program, and when the computer program is executed by the processor 1101, the steps of the foregoing data packet bearer path determining method are implemented.

Figure 12:
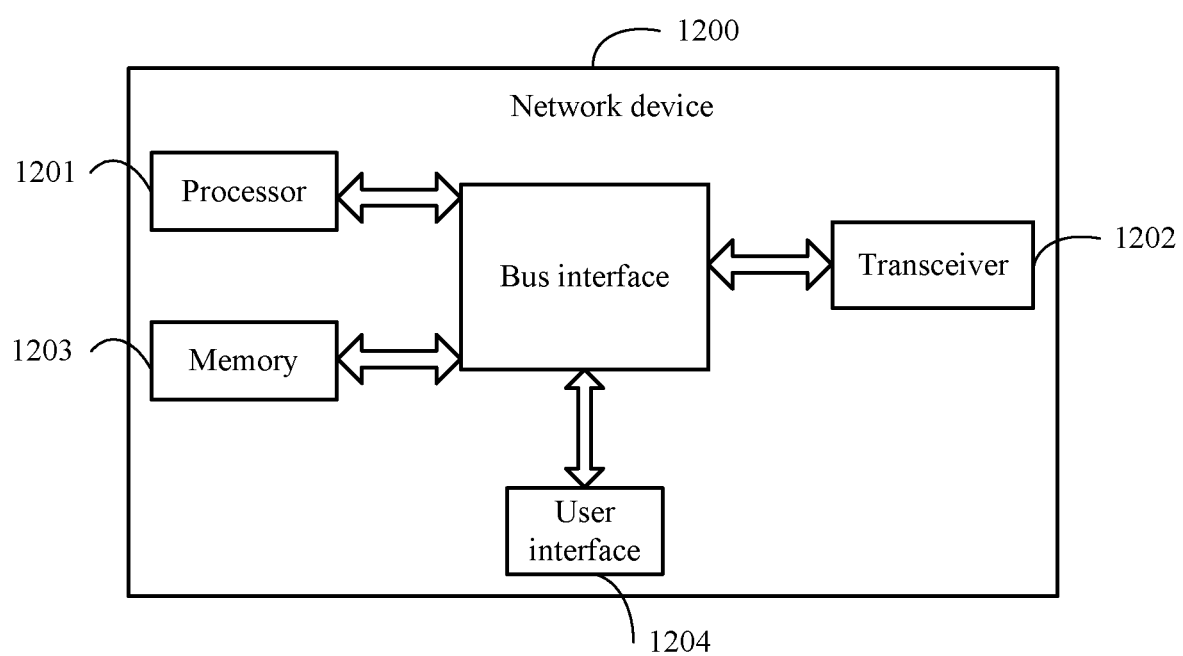
FIG. 12 is a schematic structural diagram of a network device 1200 according to some embodiments of the present disclosure.

Referring to FIG. 12, FIG. 12 is a structural diagram of a network device applied to some embodiments of the present disclosure, and the network device can implement details of the foregoing information sending method and achieve a same effect. As shown in FIG. 12, a network side device 1200 includes a processor 1201, a transceiver 1202, a memory 1203, a user interface 1204, and a bus interface.

In some embodiments of the present disclosure, the network device 1200 further includes a computer program that is stored in the memory 1203 and can be run by the processor 1201. When the computer program is executed by the processor 1201, the processes of the foregoing information sending method can be implemented, and a same technical effect can be achieved. To avoid repetition, details are not described herein again.

In FIG. 12, a bus architecture may include any quantity of interconnected buses and bridges that are specifically linked together by various circuits of at least one processor represented by the processor 1201 and a memory represented by the memory 1203. The bus architecture may further link together various other circuits such as peripheral devices, voltage regulators, and power management circuits. These are all known in the art, and therefore, no further description is provided herein. The bus interface provides an interface. The transceiver 1202 may be a plurality of components. To be specific, the transceiver 1202 includes a transmitter and a receiver, and provides a unit configured to communicate with various other apparatuses on a transmission medium. For different terminal devices, the user interface 1204 may also be an interface capable of connecting externally and internally to a required device. The connected device includes but not limited to a keypad, a display, a speaker, a microphone, a joystick, or the like.

The processor 1201 is responsible for bus architecture management and general processing. The memory 1203 may store data used by the processor 1201 when the processor 1201 performs an operation.

It can be understood that those embodiments described in some embodiments of the present disclosure can be implemented with hardware, software, firmware, middleware, microcode, or a combination thereof. For hardware implementation, a processing unit, a module, a submodule, a unit, a subunit, or the like may be implemented in at least one application specific integrated circuit (ASIC), digital signal processor (DSP), digital signal processing device (DSPD), programmable logic device (PLD), field programmable gate array (FPGA), general purpose processor, controller, microcontroller, microprocessor, or other electronic units or a combination thereof used to perform the functions in the present disclosure.

For implementation with software, the technology described in some embodiments of the present disclosure may be implemented by executing functional modules (for example, a process and a function) described in some embodiments of the present disclosure. Software codes can be stored in the memory and executed by the processor. The memory may be implemented in the processor or outside the processor.

Therefore, the objective of the present disclosure may also be implemented by running a program or a group of programs on any computing apparatus. The computing apparatus may be a well-known general-purpose apparatus. Therefore, the objective of the present disclosure may also be implemented by providing only a program product that includes program code for implementing the method or apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, it is obvious that each component or step may be decomposed and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

Some embodiments of the present disclosure further provide a computer-readable storage medium. The computer-readable storage medium stores a computer program, and when the computer program is executed by a processor, the processes of the foregoing data packet bearer path determining method or information sending method embodiment are implemented and a same technical effect can be achieved. To avoid repetition, details are not described herein again. The computer-readable storage medium includes a read-only memory (ROM), a random access memory (RAM), a magnetic disk, or an optical disc.

Some embodiments of the present disclosure further provide a computer program product that includes an instruction. When the computer runs the instruction of the computer program product, the computer executes the foregoing data packet bearer path determining method or information sending method. Specifically, the computer program product may run on the foregoing network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for a detailed operating process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on this understanding, the essence of the technical solutions of the present disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data packet bearer path determining method, performed by a terminal device, comprising:
   receiving second information used to configure a plurality of configuration paths for a target radio bearer (RB);
   determining the plurality of configuration paths based on the second information; and
   determining, by the terminal device, from the plurality of configuration paths of the target RB or a plurality of active paths in the plurality of configuration paths, a bearer path of a Packet Data Convergence Protocol (PDCP) non-duplicated data packet corresponding to the target RB, wherein the target RB is an RB configured with a PDCP data duplication function,
   wherein the plurality of configuration paths comprise at least three paths,
   wherein the bearer path is determined from the plurality of active paths, and the bearer path is determined based on a first preset determining manner, and
   wherein the first preset determining manner comprises determining the bearer path from the plurality of active paths based on a first preset rule which is agreed upon by a protocol.

2. The method according to claim 1, wherein, before determining the bearer path, the method further comprises:
   receiving first information, wherein the first information is used to configure a PDCP data duplication function for the target RB; and
   configuring the PDCP data duplication function for the target RB based on the first information.

3. The method according to claim 1, wherein, before determining the bearer path, the method further comprises:
   receiving third information, wherein the third information is used to indicate the plurality of active paths; and
   determining the plurality of active paths based on the third information.

4. The method according to claim 3, wherein the third information is used to indicate identifier information of the plurality of active paths, and determining the plurality of active paths based on the third information comprises:
   determining the plurality of active paths based on the identifier information of the plurality of active paths that is indicated in the third information, wherein the identifier information comprises at least one of an RB identifier, a logical channel identifier, a cell group identifier, or a data flow identifier.

5. The method according to claim 1,
   wherein the first preset determining manner further comprises one of the following manners:
   determining the bearer path from the plurality of active paths based on indication information of a network device;
   determining the bearer path from the plurality of active paths based on a mode of a radio link control (RLC) entity associated with an active path; or
   determining the bearer path from the plurality of active paths based on a channel quality measurement result of an active path.

6. The method according to claim 5, wherein
   the first preset rule comprises any one of the following rules:
   determining the bearer path from paths corresponding to a logical channel of a master cell group (MCG) in the plurality of active paths;

determining the bearer path from paths corresponding to
  a logical channel of a secondary cell group (SCG) in the
  plurality of active paths; or
determining, in the plurality of active paths, a path whose
  logical channel number meets a first preset condition as
  the bearer path.

7. The method according to claim 6, wherein
the first preset rule comprises: determining the bearer path
  from the paths corresponding to the logical channel of
  the MCG in the plurality of active paths; and
the bearer path is any active path corresponding to the
  logical channel of the MCG; or the bearer path is an
  active path whose logical channel number meets a
  second preset condition in the MCG.

8. The method according to claim 6, wherein
the first preset rule comprises: determining the bearer path
  from the path corresponding to the logical channel of
  the SCG in the plurality of active paths; and
the bearer path is any active path corresponding to the
  logical channel of the SCG;
or the bearer path is an active path whose logical channel
  number meets a third preset condition in the SCG.

9. The method according to claim 5, wherein
the first preset determining manner comprises: determining the bearer path from the plurality of active paths
  based on the mode of the RLC entity associated with
  the active path, wherein
when a mode of an RLC entity associated with at least one
  of the plurality of active paths is an acknowledged
  mode (AM), and the mode of the RLC entity associated
  with the at least one of the plurality of active paths is
  an unacknowledged mode (UM), the bearer path is a
  path, in the plurality of active paths, that has an
  associated RLC entity with a mode as an AM.

10. The method according to claim 5, wherein
the first preset determining manner comprises: determining the bearer path from the plurality of active paths
  based on the channel quality measurement result of the
  active path, wherein
the bearer path is a path with best channel quality in the
  plurality of active paths; or the bearer path is a path
  whose preset channel quality parameter is higher than
  or lower than a preset threshold in the plurality of active
  paths.

11. The method according to claim 10, wherein
the bearer path is the path whose preset channel quality
  parameter is higher than or lower than the preset
  threshold in the plurality of active paths; and
the preset threshold is configured by the network device.

12. The method according to claim 1, wherein, when there
are a plurality of determined bearer paths, the method further
comprises:
selecting any bearer path from the plurality of determined
  bearer paths as a target bearer path; and
sending the PDCP non-duplicated data packet through the
  target bearer path.

13. The method according to claim 12, wherein the
method further comprises:
reporting, to a media access control (MAC) layer of the
  terminal device, a data amount of the PDCP non-
  duplicated data packet sent through the target bearer
  path.

14. The method according to claim 1, wherein, when there
is one determined bearer path, the method further comprises:
using the determined single bearer path as a target bearer
  path, and sending the PDCP non-duplicated data packet
  through the target bearer path.

15. The method according to claim 1, wherein
the PDCP non-duplicated data packet comprises at least
  one of a PDCP status packet, a robust header compression (ROHC) control packet, an uplink data compression (UDC) control packet, or an Ethernet header
  compression control packet.

16. A terminal device, comprising a memory, a processor,
and a radio communication program that is stored in the
memory and run by the processor, wherein the radio communication program, when executed by the processor,
causes the processor to:
receive information used to configure a plurality of configuration paths for a target radio bearer (RB);
determine the plurality of configuration paths based on the
  information; and
determine, from a plurality of configuration paths of the
  target RB or a plurality of active paths in the plurality
  of configuration paths, a bearer path of a Packet Data
  Convergence Protocol (PDCP) non-duplicated data
  packet corresponding to the target RB, wherein the
  target RB is an RB configured with a PDCP data
  duplication function; or
determine, from a plurality of active paths in a plurality of
  configuration paths of a target RB, at least one bearer
  path of a PDCP duplicated data packet corresponding to
  the target RB, wherein the target RB is an RB configured with a PDCP data duplication function,
wherein the plurality of configuration paths comprise at
  least three paths,
wherein the bearer path is determined from the plurality
  of active paths, and the bearer path is determined based
  on a first preset determining manner, and
wherein the first preset determining manner comprises
  determining the bearer path from the plurality of active
  paths based on a first preset rule which is agreed upon
  by a protocol.

17. The terminal device according to claim 16,
wherein the first preset determining manner further comprises one of the following manners:
  determining the bearer path from the plurality of active
    paths based on indication information of a network
    device;
  determining the bearer path from the plurality of active
    paths based on a mode of a radio link control (RLC)
    entity associated with an active path; or
  determining the bearer path from the plurality of active
    paths based on a channel quality measurement result
    of an active path.

18. A non-transitory computer-readable medium, having a
radio communication program stored thereon, wherein the
radio communication program, when executed by the processor, causes the processor to:
receive information used to configure a plurality of configuration paths for a target radio bearer (RB);
determine the plurality of configuration paths based on the
  information; and
determine, from a plurality of configuration paths of the
  target RB or a plurality of active paths in the plurality
  of configuration paths, a bearer path of a Packet Data
  Convergence Protocol (PDCP) non-duplicated data
  packet corresponding to the target RB, wherein the
  target RB is an RB configured with a PDCP data
  duplication function; or
determine, from a plurality of active paths in a plurality of
  configuration paths of a target RB, at least one bearer
  path of a PDCP duplicated data packet corresponding to the target RB, wherein the target RB is an RB configured with a PDCP data duplication function, wherein the plurality of configuration paths comprises at least three paths, wherein the bearer path is determined from the plurality of active paths, and the bearer path is determined based on a first preset determining manner, and wherein the first preset determining manner comprises determining the bearer path from the plurality of active paths based on a first preset rule which is agreed upon by a protocol.

19. The non-transitory computer-readable medium according to claim 18, wherein the first preset determining manner further comprises one of the following manners:

determining the bearer path from the plurality of active paths based on indication information of a network device;

determining the bearer path from the plurality of active paths based on a mode of a radio link control (RLC) entity associated with an active path; or determining the bearer path from the plurality of active paths based on a channel quality measurement result of an active path.

20. The non-transitory computer-readable medium according to claim 18, wherein the first preset rule further comprises any one of the following rules:

determining the bearer path from paths corresponding to a logical channel of a master cell group (MCG) in the plurality of active paths;

determining the bearer path from paths corresponding to a logical channel of a secondary cell group (SCG) in the plurality of active paths; or determining, in the plurality of active paths, a path whose logical channel number meets a first preset condition as the bearer path.

* * * * *